(12) United States Patent
Fine et al.

(10) Patent No.: US 10,377,491 B1
(45) Date of Patent: Aug. 13, 2019

(54) APPARATUS AND METHOD FOR DELIVERING A DRY MATERIAL WITH AN UNMANNED AERIAL VEHICLE

(71) Applicant: Dropcopter, Inc., San Francisco, CA (US)

(72) Inventors: Adam Fine, San Francisco, CA (US); Matthew Koball, Corning, CA (US)

(73) Assignee: DROPCOPTER, San Francisco, CA (US)

( * ) Notice: Subject to any disclaimer, the term of this patent is extended or adjusted under 35 U.S.C. 154(b) by 394 days.

(21) Appl. No.: 15/134,208

(22) Filed: Apr. 20, 2016

Related U.S. Application Data

(60) Provisional application No. 62/156,053, filed on May 1, 2015.

(51) Int. Cl.
*B64D 1/16* (2006.01)
*B64C 39/02* (2006.01)

(52) U.S. Cl.
CPC .............. *B64D 1/16* (2013.01); *B64C 39/024* (2013.01); *B64C 2201/108* (2013.01); *B64C 2201/12* (2013.01); *B64C 2201/128* (2013.01)

(58) Field of Classification Search
CPC ... B64D 1/16; B64C 39/024; B64C 2201/108; B64C 2201/128; B64C 2201/12
See application file for complete search history.

(56) References Cited

U.S. PATENT DOCUMENTS

| | | | | |
|---|---|---|---|---|
| 1,455,561 A | * | 5/1923 | Allgrunn | A01M 9/0092 222/227 |
| 2,587,714 A | * | 3/1952 | Embree | A01M 9/0092 101/416.1 |
| 2,670,566 A | * | 3/1954 | Tuft | A01M 9/003 198/640 |
| 2,883,240 A | * | 4/1959 | Hahl | B01J 8/0015 406/138 |
| 3,204,896 A | * | 9/1965 | Smith | A01C 17/00 244/136 |
| 3,463,398 A | * | 8/1969 | Eason | A01C 17/00 222/334 |
| 3,484,062 A | * | 12/1969 | Johnson | B64D 1/16 169/53 |
| 3,495,793 A | * | 2/1970 | Barlow | B64D 1/16 169/53 |
| 3,777,978 A | * | 12/1973 | Manicatide | A01C 15/04 239/171 |
| 3,860,202 A | * | 1/1975 | Johnson | B64D 1/16 222/189.02 |
| 3,994,437 A | * | 11/1976 | Kitterman | A01M 7/0092 239/1 |
| 4,099,689 A | * | 7/1978 | Sterner | B64D 1/18 244/136 |

(Continued)

*Primary Examiner* — Valentina Xavier
(74) *Attorney, Agent, or Firm* — Staniford Tomita LLP

(57) ABSTRACT

A delivery device coupled to a drone can be used to distribute dry powdered materials to a target area. The powdered materials can be stored in a hopper having an auger at the lower end of the hopper. An auger motor can be actuated to transport the powdered material to an aeration chamber where the powdered material is mixed with turbulent air. The aerated powdered materials can then be emitted from the delivery device from a slinger disc onto a target area.

18 Claims, 8 Drawing Sheets

(56) References Cited

U.S. PATENT DOCUMENTS

| | | | | |
|---|---|---|---|---|
| 4,260,108 A * | 4/1981 | Maedgen, Jr. | ......... | A01N 63/00 |
| | | | | 222/161 |
| 4,262,846 A * | 4/1981 | Funkhouser | ........ | A01M 21/043 |
| | | | | 239/1 |
| 4,395,002 A * | 7/1983 | Kantojarvi | ............... | B64D 1/16 |
| | | | | 222/505 |
| 4,453,675 A * | 6/1984 | Kodadek | ................. | A01M 1/14 |
| | | | | 239/171 |
| 4,991,781 A * | 2/1991 | Barbieri | ............... | A01C 15/005 |
| | | | | 239/661 |
| 2014/0246545 A1* | 9/2014 | Markov | ................... | B64D 1/16 |
| | | | | 244/190 |
| 2016/0307448 A1* | 10/2016 | Salnikov | ................ | A01B 79/02 |
| 2017/0258005 A1* | 9/2017 | Cutter | .................. | A01C 21/005 |
| 2017/0280678 A1* | 10/2017 | Jones | .................. | A01K 5/0291 |

* cited by examiner

APPARATUS AND METHOD FOR DELIVERING A DRY MATERIAL WITH AN UNMANNED AERIAL VEHICLE

CROSS REFERENCE TO RELATED APPLICATIONS

This application claims priority to US Provisional Patent Application No. 62/156,053, "Method for Delivering Pollen and Other Powdered Substances" filed May 1, 2015 which is hereby incorporated by reference in its entirety.

FIELD OF THE INVENTION

The present invention relates to delivering pollen and other powdered substances to a desired area, specifically delivering pollen and powdered substances to specific targets, including cultivars, using a delivery device connected to an unmanned aerial vehicle.

BACKGROUND

The use of aircraft for crop dusting and seeding is over a century old. Flying aircraft low over farmland to distribute liquids or solids suspended in an aqueous solution, generally consisting of pesticides, is commonly used worldwide. Within the last few decades, some countries like Japan have increasingly used unmanned aerial vehicles ("UAV"), for spray and seed applications of crops such as rice (www.gizmag.com/uav-crop-dusting/27974, Apr. 15, 2015). Currently, the use of UAVs for pollination of plants or delivery of powdered substances is unknown. According to the Harvard professors involved in the "Robobee" research program, the use of robots for pollination is at least twenty years in the future (robobees.seas.harvard.edu/robobees-project-and-colony-collapse-disorder-ccd, Apr. 15, 2015). Manned, full-sized helicopters have been used in attempts to catalyze anemophily, otherwise known as wind-pollination (U.S. Pat. No. 4,644,683, Jones et al). For example, Jones et. al discloses pollination using a helicopter piloted by a pilot flying over fields and the wind generated by the helicopter propeller causes the pollen to become airborne and reach the desired target, thereby hopefully pollinating wind-pollinated crops, such as corn. However, manned helicopters are very expensive to operate, making helicopter catalyzed anemophily very expensive without a guarantee of successful pollination rate for the high cost. Further, these manned helicopters do not drop pollen but rather they only disperse pollen by hovering over the plants and dispersing the pollen that is already available from the plants it is hovering over. In addition, flying close to the ground is dangerous for not only helicopters but aircraft as well. Full-sized helicopters and aircraft are well suited to large, flat fields free of obstacles; helicopters and aircraft are not well suited for flying close to the ground in areas that contain obstacles or are within close proximity to urban, populated or otherwise sensitive areas. Finally, both helicopters and airplanes are not well suited for distribution of small particulates, such as pollen and powders.

Therefore, current mechanical pollinators are controlled by human operators and are generally hand-held (for example, U.S. Pat. No. 3,962,821, Sharp et al.) or ground-based systems (for example, Copes, D. L., O'Rourke, D., and Randall, W. K., 1995. Field Testing a Modified Duster for Supplemental Mass Pollination in Douglas-fir Seed Orchards. Tree Planters' Notes. 46(4):118-125). However, hand-held pollinators of a billow type can be labor intensive. Further, if pollination is required at significant heights, using a hand-held pollinator can be risky due to the potential for sustaining injuries from falling.

Conversely, ground-based pollination systems, such as mechanical blowers and air compressors, are sometimes employed for pollinating crops, and are generally either pulled by a motor vehicle, such as a tractor (Copes, et al., 1995), or by hand-pulled cart (Ibrahim, A. A., AI-Shaikhly, K. J., and Yousif, Y. G., Development of a New Ground Level Pollinator for Date Palm, Publication of the Dept. Palms and Dates, Agric. Water Reso. Res. Center, Sci. Res. Council, P.O. Box 2416. Baghdad, Iraq, (date of publication unknown)). Limitations of pollination height of such ground-based systems are inherent, as a height limitation of the pollen dispersion is limited and therefore this method may not be an option. Lifting the machinery up, suspending it and then moving it for pollination purposes is a possibility, but a new set of challenges arise with this method. Specifically, heavy machinery that is suspended in the air to pollinate trees would likely require moving the machinery over uneven or unstable field and orchard ground, thereby risking an unintended and sudden release of the machinery, thereby damaging the machinery and possibly even causing injury to the operator. Further, and similar to the methods involving manned aircraft, these land-based methods may be limited in accessibility to target areas and crops due to rough terrain or terrain with many obstacles making ground based navigation difficult if not impossible.

What is needed is an effective and safe method and apparatus to deliver pollen or other dry powdered materials remotely from an unmanned airborne vehicle, this would save labor costs and could increase usable farm and crop yield.

SUMMARY OF THE INVENTION

It is an objective of the present invention to provide a method and apparatus for unmanned, aerial and effective pollination of cultivars or delivery of other powdered substances. Another objective of the present invention is to overcome the limitations inherent in the other known methods of pollination of cultivars listed above.

A method and apparatus for delivering a powdered substance or pollen over an area, including a field of cultivars, is described. The method includes placing the powdered substance or pollen into a delivery device which is connected to an unmanned aerial vehicle, remotely flying the unmanned aerial vehicle over the desired area (which may include cultivators) and dispersing the powdered substance or pollen through the air, thereby delivering the powdered substance or pollen onto the cultivars or other target.

The apparatus includes a delivery device coupled to the remotely operated unmanned aerial vehicle such as a drone, helicopter, or other controllable airborne vehicle. The delivery device can have a container for holding the dry material, an auger, and an auger motor coupled to the auger. The auger motor can rotate to actuate the auger and release the dry material from the delivery device when the remotely operated unmanned aerial vehicle is over the target area. In an embodiment the delivery device can have a global positioning system (GPS) unit that can be programed to identify the target area so that the delivery device can know where to release the dry materials.

The delivery device may also have a flight controller that can determine a speed and location of the aerial vehicle transporting the delivery device. providing a flow meter coupled to the auger to measure a flow rate of the dry material from the auger. The flow rate of the dry material from the delivery device can be proportional to a detected speed of the unmanned aerial vehicle, the flow rate of the dry material can be increased by increasing the rotational speed of the auger motor when the speed of the aerial vehicle increases. Conversely, the flow rate of the dry material can be decreased by decreasing the rotational speed of the auger motor when the speed of the unmanned aerial vehicle decreases.

In an embodiment, the delivery device can include an agitator coupled to the auger motor. The agitator can rotate within the container of the delivery device. The agitator can comprise a drive shaft and whiskers coupled to the drive shaft. Actuating the auger motor causes the drive shaft to rotate and the whiskers of the agitator can move the dry material within the container. More specifically, the ends of the whiskers can scrape against the inner surfaces of the container and cause the dry materials to travel down to the auger.

In an embodiment, a blower fan motor can be coupled to a blower fan that is attached to the delivery device and mounted under the auger. The blower fan motor can be actuated to rotate the blower fan to disperse the dry material that has exited from the delivery device through the auger. The blower fan motor can be actuated when the remotely operated unmanned aerial vehicle is over the target area. The blower fan motor can be stopped to stop the rotation of the blower fan and prevent the dispersion of the dry material from the delivery when the remotely operated unmanned aerial vehicle is not over the target area. In another embodiment, an aeration chamber can be coupled to the delivery device under the auger. The blower fan can be actuated and air can be directed from the blower fan into the aeration chamber. The dry material can be carried by the air from the blower fan out of the aeration chamber.

In an embodiment, a slinger disc can be coupled to the delivery device and coupled to a slinger disc bearing under the auger. The slinger disc can rotate like a pinwheel by the air flow from the blower fan and the propellers of the airborne vehicle. Dry material from the aeration chamber can contact the slinger disc. The rotating slinger disc can then distribute the dry material under the unmanned aerial vehicle over the target area.

DETAILED DESCRIPTION

The present invention relates to an apparatus and method of pollination of cultivars by an unmanned aerial vehicle.

The following text sets forth a broad description of a plurality of different embodiments of the present invention. The description is to be construed as exemplary only and does not describe every possible embodiment since describing every possible embodiment would be impractical, if not impossible, and it should be understood that any feature, characteristic, component, composition, ingredient, product, step or methodology described herein can be deleted, combined with or substituted for, in whole or in part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents herein are incorporated by reference.

It should also be understood that, unless a term is expressly defined in this specification using the sentence "As used herein, the term '_____' is hereby defined to mean . . . " or similar sentence, there is no intent to limit the meaning of that term, either expressly or by implication, beyond its plain or ordinary meaning, and such term should not be interpreted to be limited in scope based on any statement made in any section of this patent (other than the language of the claims). No term is intended to be essential to the present invention unless so stated. To the extent that any term recited in the claims at the end of this patent is referred to in this patent in a manner consistent with a single meaning, that is done for the sake of clarity only so as to not confuse the reader, and it is not intended that such a claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
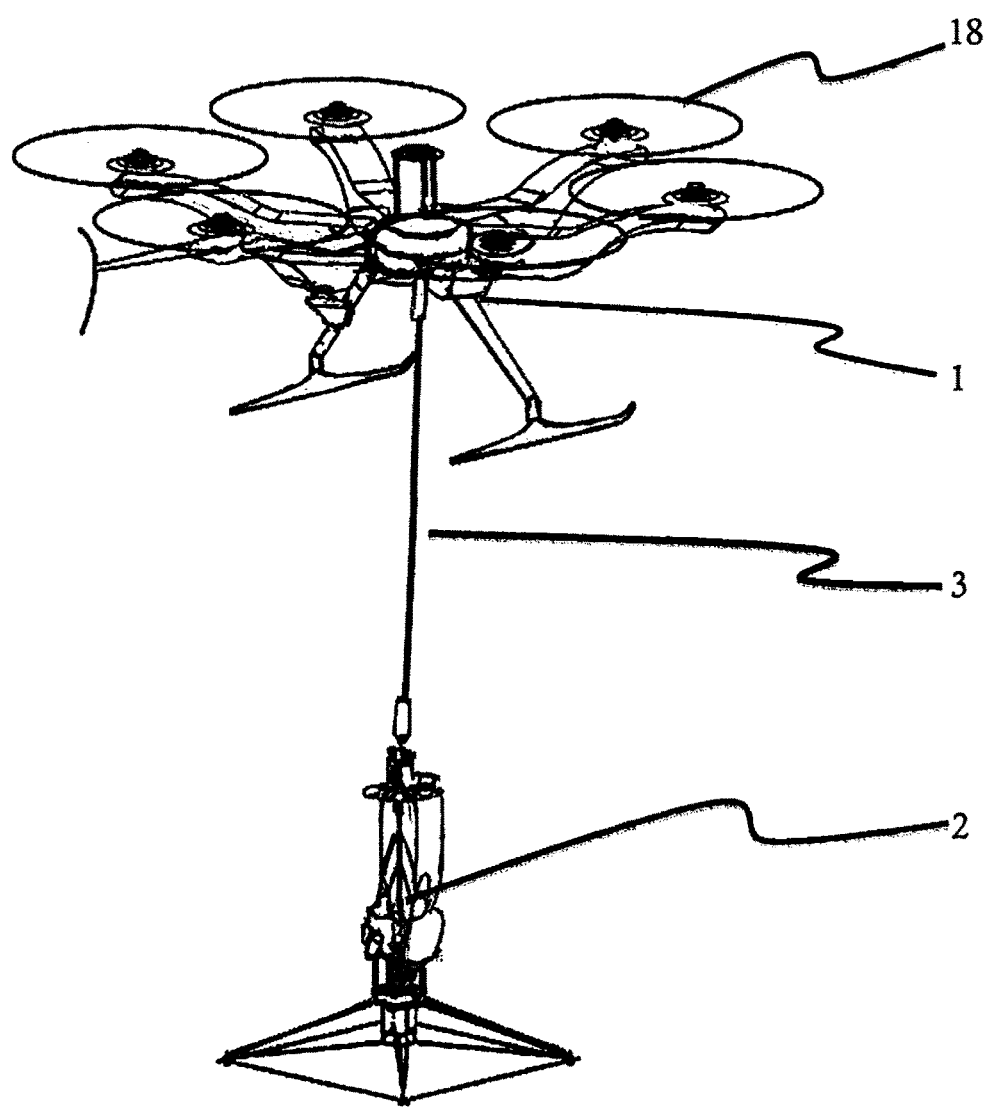
FIG. 1 is an illustration of an unmanned aerial vehicle with an embodiment of a delivery device suspended from the unmanned aerial vehicle.

With reference to FIG. 1, an embodiment of a delivery device 2 attached to an unmanned aerial vehicle 1 which can have a plurality of rotating propellers 18 is illustrated. The delivery device 2 can be used for delivering a powdered substance, such as pollen, to plants or other targets by aerial means is shown. The delivery device 2 can be coupled to the unmanned aerial vehicle 1 with a cable 3. To use the deliver device 2, pollen can be placed into the delivery device 2. The delivery device 2 can be connected to an unmanned aerial vehicle 1 by a suspension cable 3. The unmanned aerial vehicle 1 can transport the delivery device 2 to the target area and the delivery device 2 can disperse the pollen through the air onto said plants.

Figure 2:
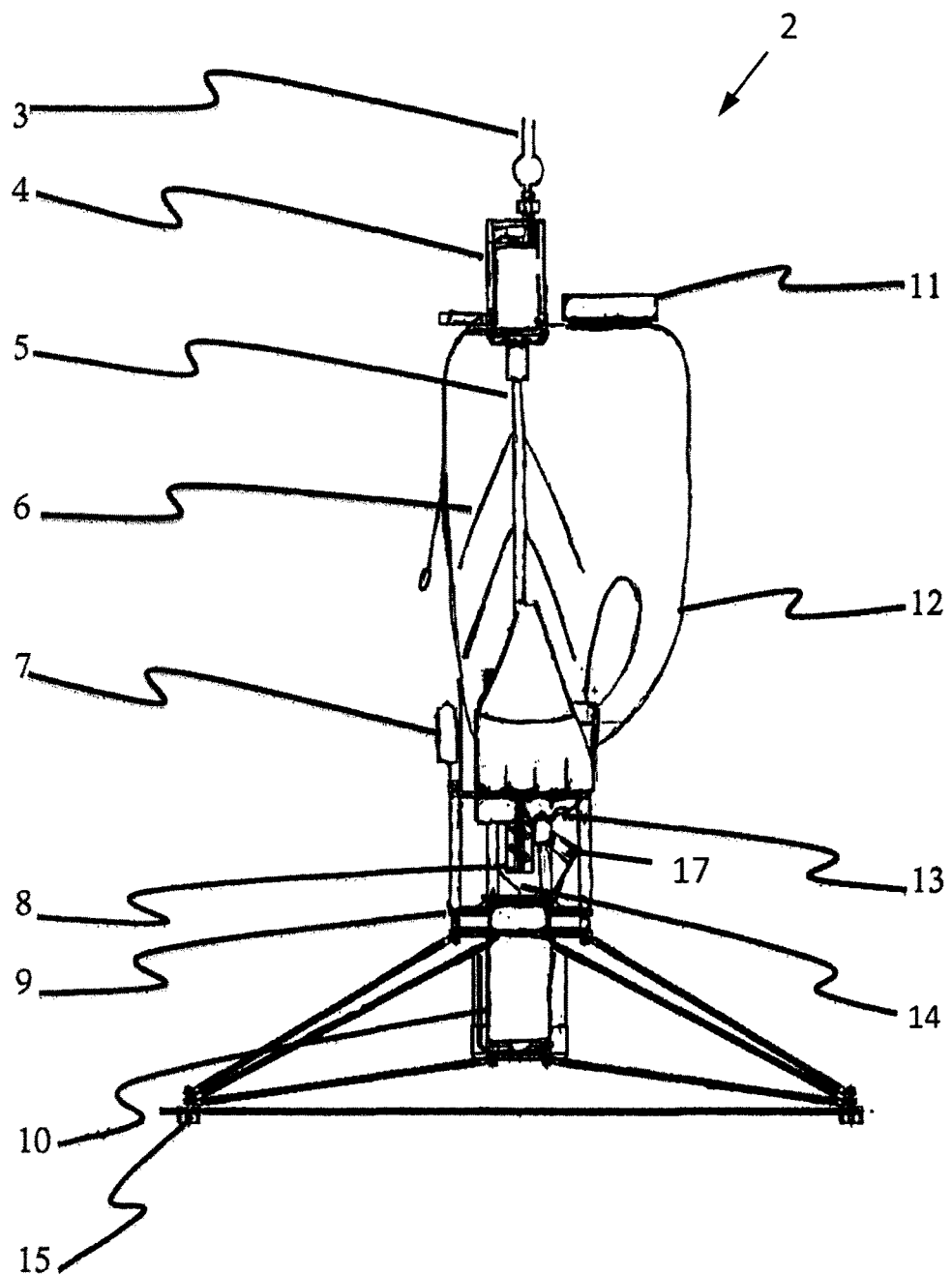
FIG. 2 is an illustration of a side section view of an embodiment of a delivery device.

With reference to FIG. 2, a section view of an embodiment of a delivery device 2 is shown. The delivery device 2 can be coupled to a suspension cable 3 from which the delivery device 2 is attached to the unmanned aerial vehicle (not shown). The main components of the delivery device 2 include a hopper container 12 which holds the dry powdered material, which can be pollen and an auger 8, which can have helical blades which can be rotated to transport the dry powdered materials from the hopper container 12 to the target area. In this embodiment, the hopper container 12 can be filled with powdered substances or pollen through the hopper filler 11, which can include a removable cap.

In one embodiment, when actuated the auger motor 4 rotates a drive shaft 5 that is coupled to whiskers 6 and the auger 8. The drive shaft 5 turns the whiskers 6 and the auger 8 both of which assist in the agitation of the powdered substance or pollen within the hopper container 12. The movement of the whiskers 6 and auger 8 cause the powdered substance or pollen to travel to the bottom of the hopper container 12 and out the orifice 13. The motor speed controls 7 can control the voltage delivered to the auger motor 4 or otherwise control the rotational speed of the auger motor 4. The rotational speed of the auger motor 4 can be proportional to the voltage delivered by the motor speed controls 7.

The drive shaft 5 is connected to the auger 8 which assists the powdered substance or pollen movement and transfer from the container 12 to the orifice 13. In an embodiment, the orifice 13 can be an "auger valve", shown here in the open position. The powdered substance or pollen travels from the auger 8 and orifice 13 into the space between the auger valve and the fan which is termed the "pollen staging area" 14 which can also be known as an aeration chamber where the turbulent air is mixed with the pollen or other dry powdered material before being dispersed over the target area. A slinger disc 9 can be coupled to a slinger disc motor 10 under the pollen staging area 14. The slinger disc motor 10 can be coupled to the motor speed control 7 which can control the rotational speed of the slinger disc motor 10. When actuated, the slinger disc motor 10 can rotate which can then rotate the slinger disc 9. The pollen or dry powdered materials can fall onto the slinger disc 9 and the rotation of the slinger disc 9 disperses the powdered material outward from the delivery device. A faster rotational speed will cause a wider dispersion of the powdered materials. The landing gear 15 extends outward from the bottom of the delivery device 2 and is used to assist in protecting the delivery device 2 when landing the present invention.

In an embodiment of the present invention, the motor speed control 7 of the delivery device 2 can have a voltage regulator that can be used to meter the amount of pollen or other powdered substances dispersed from the delivery device 2. The voltage regulator may consist of a slinger disc motor 10 voltage regulator, an auger motor 4 voltage regulator or both a slinger disc motor 10 voltage regulator and auger motor 4 voltage regulator. In additional embodiments of the present invention, the motor speed control 7 may include multiple slinger disc motor 10 and auger motor 4 voltage regulators. The voltage regulator(s) may be used to meter the amount of pollen or other powdered substances being output from the deliver device 2.

In other embodiments, the delivery device 2 can have a separate powdered material flow meter 17 that measure the flow rate of the powdered material from the delivery device 2. In an embodiment, the inventive system can monitor and adjust the flow rate of the powdered material over the target area based upon the speed of the aerial vehicle and delivery device 2 so that the powdered material is evenly distributed over the target area regardless of the speed. More specifically, when the delivery device 2 is traveling at a slower speed, the flow rate of the powdered material can be reduced by slowing the rotational rate of the auger 8 and auger motor 4. Conversely, when the delivery device 2 is traveling at a higher speed, the flow rate of the powdered material can be increased by increasing the rotational rate of the auger 8 and auger motor 4.

Figure 3:
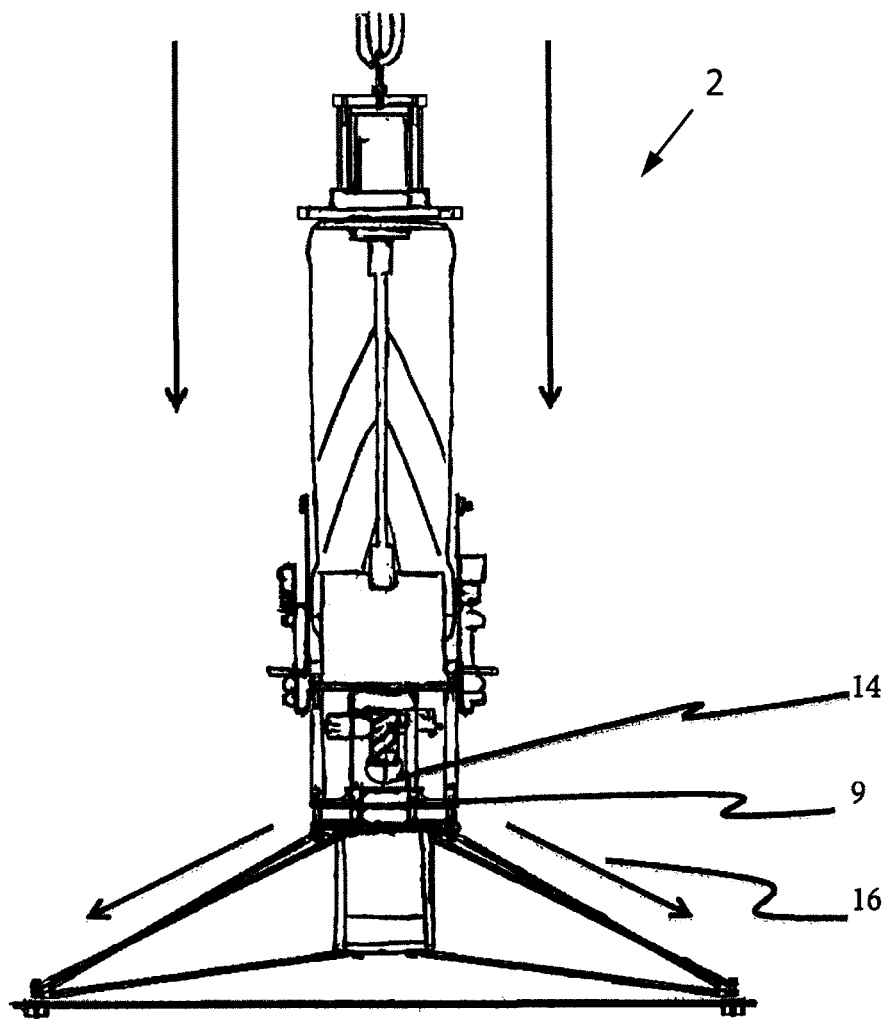
FIG. 3 is an illustration of a side section view of an embodiment of the delivery device and the airflow below the unmanned aerial vehicle.

With reference to FIG. 3, the delivery device 2 is illustrated while being transported with the aerial vehicle over a target area. Air flow from the aerial vehicle which can be a helicopter drone is directed down from the propellers. The delivery device 2 can be actuated to release the powdered substance or pollen from the hopper container and allow the powdered materials to reach the pollen staging area 14. The slinger disc motor is actuated and the slinger disc 9 slings the powdered substance or pollen in a generally horizontal direction, represented by the generally horizontal arrows 16, thereby assisting in the dispersal of the powdered substance or pollen released from the container through the air. This downward airflow from the aerial vehicle also serves to assist the powdered substance or pollen in the desired downward trajectory for dispersion and delivery.

Figure 4:
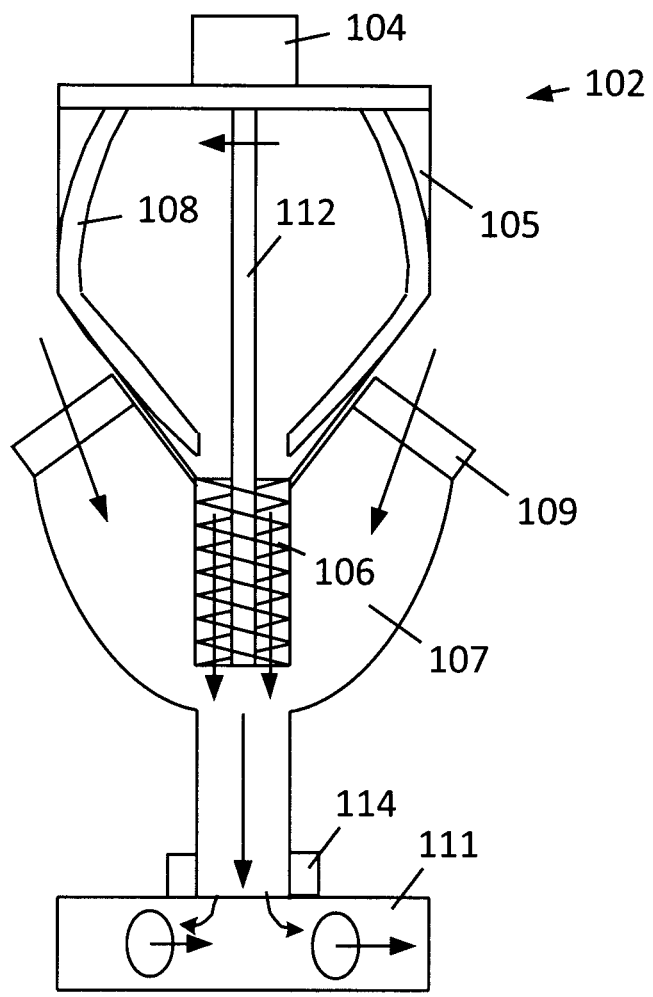
FIG. 4 is an illustration of a side section view of an embodiment of the delivery device and the airflow and particle flow within the delivery device.

In different embodiments, the delivery device can have different configurations. FIG. 4 illustrates a different embodiment of the delivery device 102, which can have a different configuration than the delivery devices illustrated in FIGS. 1-3. In this embodiment, the delivery device 102 can include a hopper 105, an aeration chamber 107 with fans 109 and a slinger disc 111. The powdered material which can be pollen can be stored in the delivery device 102. An agitator 108 and auger 106 can be coupled to a center rod 112 and mounted within the hopper 105. The agitator 108 and auger 106 can be rotated by an auger motor 104 that is coupled to the center rod 112. The rotation of the agitator 108 can remove the powdered material from the inner surfaces of the hopper 105 to flow out of the bottom of the hopper 105 into the aeration chamber 107. The powdered material can flow into the top of the auger 106. The rotation of the auger 106 can drive the powered material out of the bottom of the hopper 105.

Fans 109 can be mounted on the upper portions of the aeration chamber 107 and blow air into the hollow aeration chamber 107 that is mixed with the powdered materials from the auger 106. The slinger disc 111 can be mounted to the bottom of the aeration chamber 107 and rotated about a bearing 114. The slinger disc 111 may have a plurality of orifices from which the powdered substance or pollen exits into the ambient air. The aeration chamber can be coupled to one or more fans 109 which can cause ambient air to flow into the aeration chamber 107 where it is mixed with the dry powdered material from the hopper 105. The turbulent air and powered material can exit the bottom of the aeration chamber 107 and flow through the slinger disc 111 which can rotate freely. The air pressure from the fans 109 flowing through the slinger disc 111 can cause rotation which distributes the powdered materials out of the side surfaces of the slinger disc 111.

Figure 5:
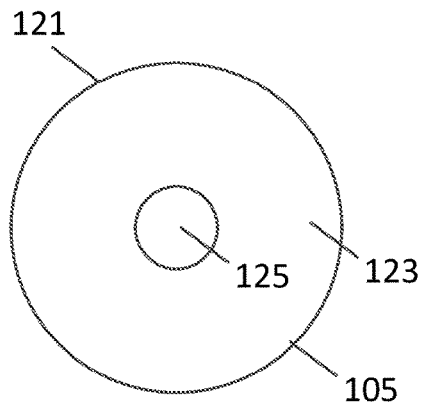
FIG. 5 is a top view of an embodiment of a hopper.
Figure 7:
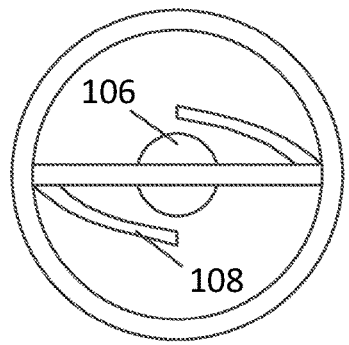
FIG. 7 is a top view of an embodiment of an auger and agitator assembly.
Figure 6:
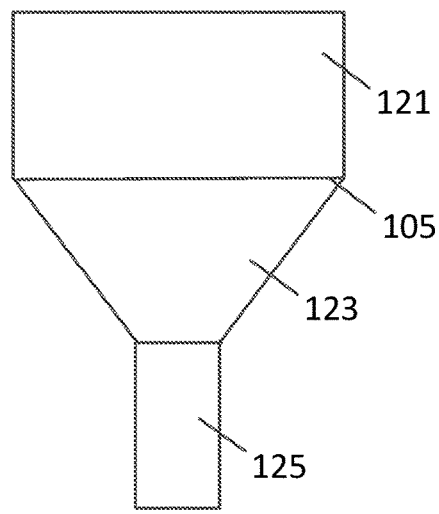
FIG. 6 is a side view of an embodiment of a hopper.
Figure 8:
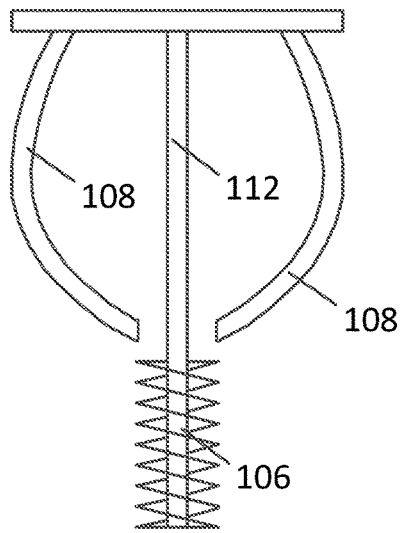
FIG. 8 is a side view of an embodiment of an auger and agitator assembly.

FIG. 5 illustrates a top view and FIG. 6 illustrates a side view of an embodiment of the hopper 105. The hopper 105 can have an upper wide cylindrical portion 121, a middle conical portion 123 and a lower narrow cylindrical portion 125. FIG. 7 illustrates a top view and FIG. 8 illustrates a side view of an embodiment of an agitator auger assembly. The agitator can have one or more arms that contact the inner surfaces of the upper wide cylindrical portion 121 and middle conical portion 123 of the hopper 105. The auger 106 can be a double helical configuration which is coupled to the center rod 112. The rotation of the auger 106 moves the powdered materials down through the lower cylindrical portion of the hopper 106.

Figure 9:
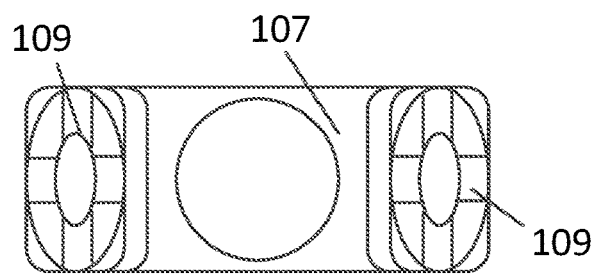
FIG. 9 is a top view of an embodiment of an aeration chamber.
Figure 10:
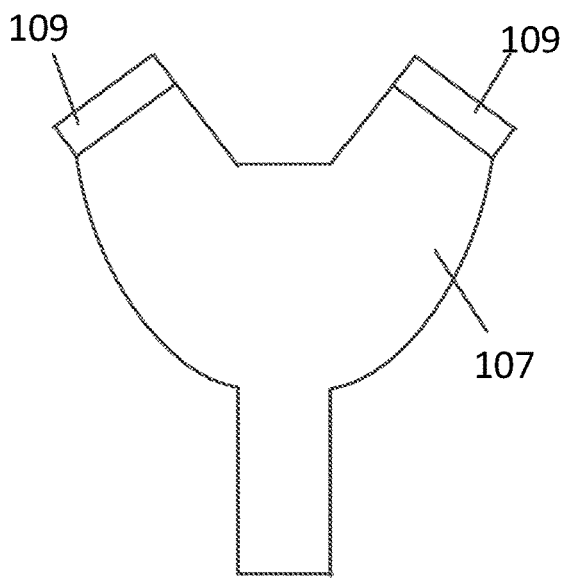
FIG. 10 is a side view of an embodiment of an aeration chamber.
Figure 11:
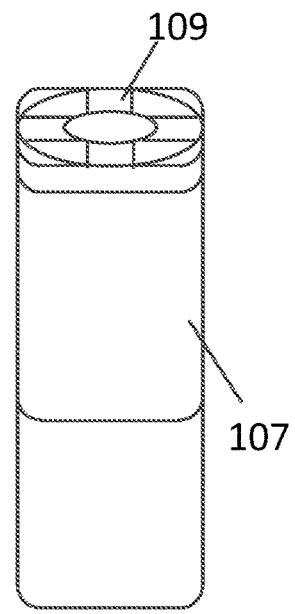
FIG. 11 is an edge view of an embodiment of an aeration chamber.

FIG. 9 illustrates a top view, FIG. 10 illustrates a side view and FIG. 11 illustrates an edge view of an embodiment of an aeration chamber 107. The aeration chamber 107 can be a "Y" shaped hollow structure. The upper ends of the aeration chamber 107 be coupled to fans 109 which can be actuated to blow air into the aeration chamber 107. The upper center portion of the aeration chamber can have a hole into which the narrow cylindrical portion of the hopper can be inserted. The lower portion of the aeration chamber 107 can be cylindrical in shape.

Figure 12:
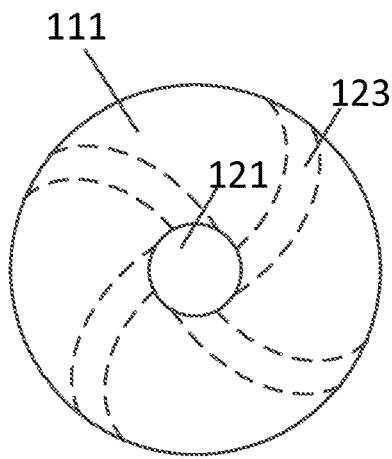
FIG. 12 is a top view of an embodiment of a slinger disc.
Figure 13:
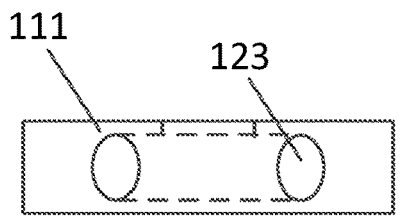
FIG. 13 is a side view of an embodiment of a slinger disc.

FIG. 12 illustrates a top view and FIG. 13 illustrates a side view of an embodiment of the slinger disc 111 which can be coupled to a bearing which allows the slinger disc 111 to rotate about a center axis. In this embodiment, the air and powdered materials from the aeration chamber can enter a center hole 121 on the upper surface of the slinger disc 111 and flow through internal passageways 123 which can be curved. Air flow through the passageways 123 can cause the slinger disc 111 to rotate. In this example, the passageways 123 are curved in a counter clockwise direction and airflow exiting the passageways 123 will cause the slinger disc 111 to rotate in a clockwise direction. In other embodiments, the slinger disc 111 can be coupled to a slinger disc motor as illustrated in FIG. 2 or have any manifold shape which will result in rotation of the slinger disc 111 when fluid and dry powder flow radially outward through the slinger disc 111.

Figure 14:
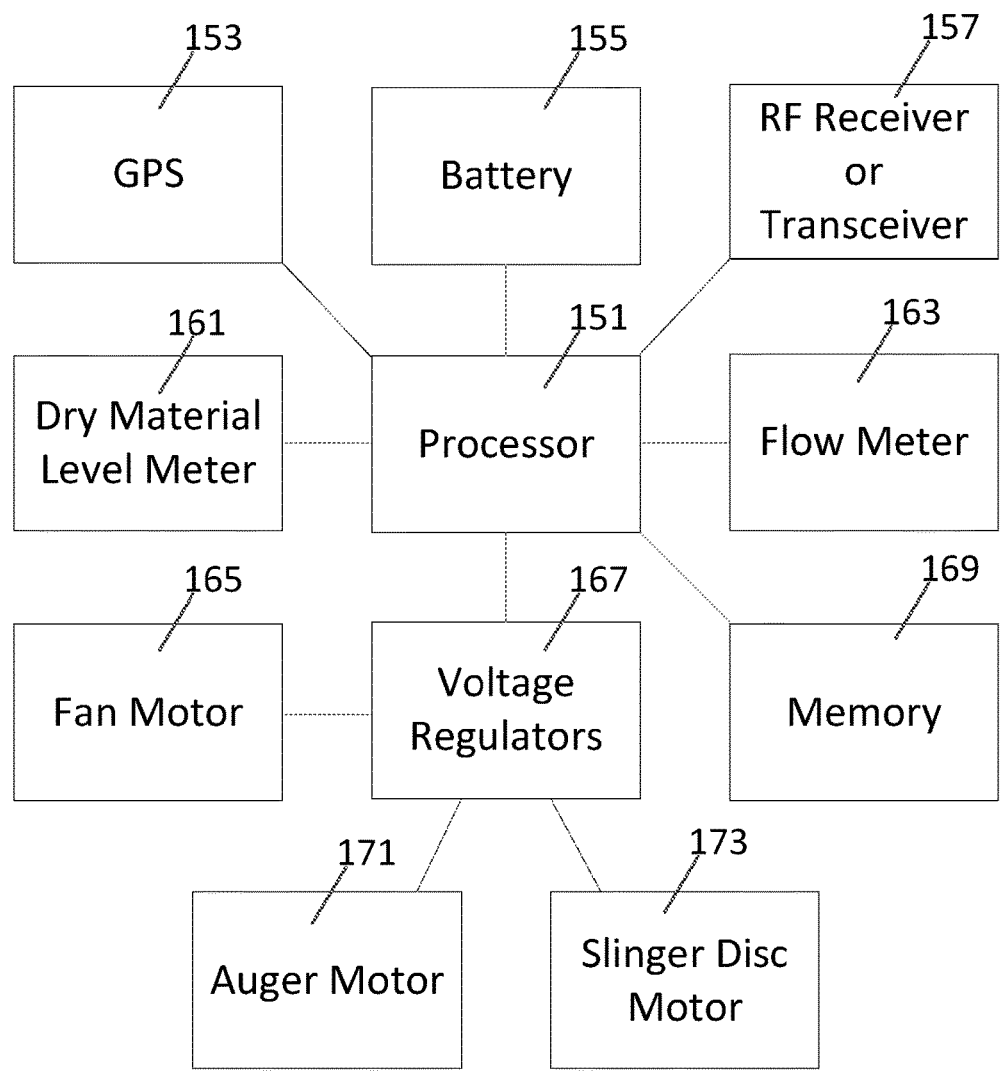
FIG. 14 is a block diagram of system components in an embodiment of a delivery device.

FIG. 14 illustrates an embodiment of a block diagram of the delivery device system components. The delivery system can have a processor 151 which is powered by a rechargeable battery 155. The processor 151 can be coupled to a GPS 153 for determining the locations of the delivery device. The GPS 153 location information can be compared by the processor 151 to target location information stored in the memory 169. The processor 151 can also be coupled to an RF receiver or RF transceiver 157 which can receive and/or transmit data to a remote controller which can be operated by a system user.

When the delivery device is over the target area, the processor 151 can command the voltage regulator 167 to actuate the auger motor 171 and the aeration chamber fan motors 165. Alternatively, the processor 151 may command the voltage regulator 167 to actuate the auger motor 171 and the slinger disc motor 173. The processor 151 can determine the rate of powdered material flow from the hopper with the flow meter 163 and the speed of the delivery device from the GPS 153 signals. The processor 151 can then independently adjust the speeds of the fan motor 165 and the auger motor 171 or the auger motor 171 and the slinger disc motor 173 based upon the speed and location of the delivery device. The delivery device may also have a dry material level meter 161 which can monitor the amount of dry material in the hopper. After all the dry powdered material is drained from the hopper, the processor 151 can control the voltage regulators to stop the rotation of the fan motor 165 and the auger motor 171 or the auger motor 171 and the slinger disc motor 173.

Figure 15:
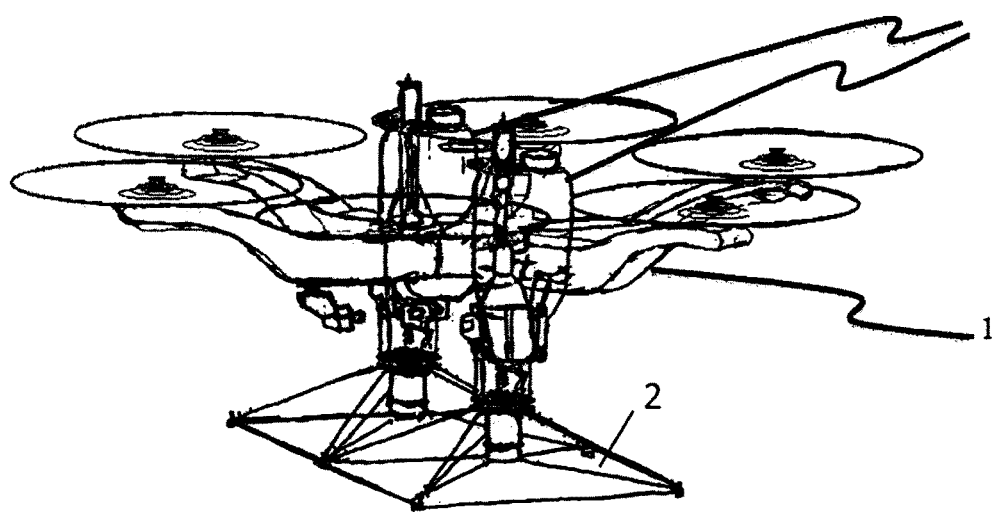
FIG. 15 is an illustration of an unmanned aerial vehicle with a delivery device suspended from the unmanned aerial vehicle with a plurality of containers, augers, orifices, and fans.

Referring now to FIG. 15, another embodiment of the invention comprises a plurality of delivery devices described above with reference to FIGS. 1-3, including a plurality of containers, augers, orifices, and fans. In addition, the delivery device 2 is integrated into the unmanned aerial vehicle 1. In this embodiment, the delivery device 2 is not suspended, and therefore a suspension cable is not needed to couple the deliver device 2 to the aerial device 1.

In still yet another embodiment of the present invention, the present invention uses a pollen or other powdered substance metering method for the delivery device. The metering method may be used to control the airspeed of the unmanned aerial vehicle. For example, one of the embodiments of the metering method has automated presets that can be selected by the user. Specifically, one such preset may be "Almond pollen" which, when selected from the preset menu of the present invention, automatically meters the correct amount of Almond pollen to the UAV airspeed being flown. Other metering method embodiments of the present invention comprise other automated presets for precisely metering the correct amount of material released for the airspeed.

In another embodiment of the present invention, the delivery device power source may be the same power source that supplies power to the UAV. In a different embodiment, the delivery device may have a separate power source from the UAV. In either embodiment, the power supplied to the delivery device may be turned on and off remotely. The ability to turn the delivery device on and off prevents the loss, release and/or the wasting pollen or other powdered substance unnecessarily when positioning the vehicle over treetops or other target.

In yet another embodiment, the delivery device is connected to a global positioning service ("GPS") device. In this embodiment, the delivery device may be automatically switched on and off based on its global positioning service position and/or coordinates in relation to the target cultivators or other targets.

The preferred method for powdered substance or pollen delivery uniformly throughout a field, orchard or target area consists of placing the powdered substance or pollen into a container connected to the delivery device, which is connected to an UAV. After the powdered substance or pollen is secured in the deliver device, the present invention is flown over a field, orchard or other target area, preferably in a regular pattern, while releasing the powdered substance or pollen remotely so as to be capable of providing effective powdered substance saturation or pollination saturation.

The present invention can be used for various applications other than pollination. For example, wineries regularly spread sulfur and other minerals onto grapes. Beneficial granular materials can be spread by the delivery device onto rice crops and other orchards. There are even beneficial insects such as predator mites that can be dropped over crops to eat pest mites such as spiders and citrus mites. The delivery device can also be used for non-agricultural applications. For example, it can be necessary to quickly spread salt onto roadways. In an embodiment, the delivery devices can be configured to drop salt onto roadways that need to be deiced. Currently, automated tractors can be used to sow crop seeds. In some embodiments such as rice for example, the dry crop seeds are flown over the field by a delivery device carried by an aerial vehicle and dropped over the field to be planted. In different embodiments, the inventive delivery device can be modified by scaling the size of the device or other alterations to perform various other powdered material tasks.

The present disclosure, in various embodiments, includes components, and apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

What is claimed is:

1. A method for delivering dry material to a target area with an unmanned aerial vehicle comprising:
providing a delivery device having a container for holding the dry material, an auger, an agitator in contact with an inner surface of a middle conical portion of the container, and an auger motor, wherein the auger motor, the auger, and the agitator are coupled to a center rod and the delivery device is coupled to the remotely operated unmanned aerial vehicle;
flying the remotely operated unmanned aerial vehicle;
rotating the auger motor which rotates the center rod, the agitator within the container to remove the dry material from the inner surfaces of the container, and the auger; and
releasing the dry material from the delivery device when the remotely operated unmanned aerial vehicle is over the target area; and
stopping the auger motor to stop the rotation of the auger and prevent the release of the dry material from the delivery when the remotely operated unmanned aerial vehicle is not over the target area.

2. The method of claim 1 further comprising:
providing a global positioning system coupled to a processor for determining a speed and a location of the unmanned aerial vehicle.

3. The method of claim 1 further comprising:
providing a flight controller for determining a speed and a location of the unmanned aerial vehicle.

4. The method of claim 1 further comprising:
providing a blower fan motor coupled to a blower fan attached to the delivery device and mounted under the auger;
actuating the blower fan motor to rotate the blower fan to disperse the dry material from the delivery device when the remotely operated unmanned aerial vehicle is over the target area; and
stopping the blower fan motor to stop the rotation of the blower fan and prevent the dispersion of the dry material from the delivery when the remotely operated unmanned aerial vehicle is not over the target area.

5. The method of claim 4 further comprising:
providing an aeration chamber coupled to the delivery device under the auger wherein air is directed from the blower fan into the aeration chamber and the dry material is carried by the air from the blower fan out of the aeration chamber.

6. The method of claim 5 further comprising:
providing a slinger disc coupled to the delivery device and mounted under the auger; and
moving the dry material from the aeration chamber to the slinger disc to distribute the dry material under the unmanned aerial vehicle over the target area.

7. The method of claim 6 further comprising:
rotating the slinger disc when the unmanned aerial vehicle is over the target area.

8. The method of claim 1 further comprising:
distributing the dry material from the slinger disc evenly to the target area across a dispersion width that is perpendicular to a path of the unmanned aerial vehicle.

9. The method of claim 1 further comprising:
providing a flow meter coupled to the auger to measure a flow rate of the dry material from the auger;
wherein the flow rate of the dry material is proportional to a detected speed of the unmanned aerial vehicle, the flow rate of the dry material is increased by increasing the speed of the auger motor when the speed of the unmanned aerial vehicle increases and the flow rate of the dry material is decreased by decreasing the speed of the auger motor when the speed of the unmanned aerial vehicle decreases.

10. A delivery device for delivering a dry material to a target location with an unmanned aerial vehicle:
a container for holding the dry material;
an auger coupled to a lower portion of the container with;
an agitator in contact with an inner surface of a middle conical portion of the container;
an auger motor; and
a center rod directly coupled to the auger motor and the auger;
wherein when the remotely operated unmanned aerial vehicle flies over the target area the auger motor rotates the center rod, the auger and the agitator and the dry material is released from the delivery device when the remotely operated unmanned aerial vehicle is over the target area and wherein the auger motor and the rotation of the auger are stopped to prevent the release of the dry material from the delivery when the remotely operated unmanned aerial vehicle is not over the target area.

11. The delivery device of claim 10 further comprising:
a global positioning system coupled to a processor for determining a speed and a location of the unmanned aerial vehicle.

12. The delivery device of claim 10 further comprising:
a flight controller for determining a speed and a location of the unmanned aerial vehicle.

13. The delivery device of claim 10 further comprising:
a blower fan motor coupled to a blower fan attached to the delivery device and mounted under the auger;
wherein the blower fan motor is actuated to rotate the blower fan to disperse the dry material from the delivery device when the remotely operated unmanned aerial vehicle is over the target area and the blower fan motor is stopped to stop the rotation of the blower fan and prevent the dispersion of the dry material from the delivery when the remotely operated unmanned aerial vehicle is not over the target area.

14. The delivery device of claim 13 further comprising:
an aeration chamber coupled to the delivery device under the auger, wherein air is directed from the blower fan into the aeration chamber and the dry material is carried by the air from the blower fan out of the aeration chamber.

15. The delivery device of claim 14 further comprising:
a slinger disc coupled to the delivery device and mounted under the auger;
wherein the dry material is moved from the aeration chamber to the slinger disc to distribute the dry material under the unmanned aerial vehicle over the target area.

16. The delivery device of claim 15 further comprising:
a sling disc bearing coupled to the sling disc that allows the slinger disc to rotate axially relative to the container.

17. The delivery device of claim 10 further comprising:
a flow meter coupled to the auger to measure a flow rate of the dry material from the auger.

18. The delivery device of claim 17 further comprising:
a controller coupled to the flow meter and the auger motor;
wherein the flow rate of the dry material is controlled by the controller to be proportional to a detected speed of the unmanned aerial vehicle, the flow rate of the dry material is increased by increasing the speed of the auger motor when the speed of the unmanned aerial vehicle increases and the flow rate of the dry material is decreased by decreasing the speed of the auger motor when the speed of the unmanned aerial vehicle decreases.

* * * * *